United States Patent
Alhassoon

[11] Patent Number: 5,886,628
[45] Date of Patent: Mar. 23, 1999

[54] DELAYED AUTO BRAKE LIGHT

[76] Inventor: Adel A. Alhassoon, P.O. Box 88864, Riyadh 11672, Saudi Arabia

[21] Appl. No.: 902,110

[22] Filed: Jul. 29, 1997

[51] Int. Cl.$^6$ .................................................. B60Q 1/44
[52] U.S. Cl. ........................................... 340/479; 340/463
[58] Field of Search ..................... 340/479, 463, 340/309.3, 309.15, 464, 468

[56] References Cited

U.S. PATENT DOCUMENTS

| | | | |
|---|---|---|---|
| 3,576,527 | 4/1971 | Howard | 340/67 |
| 3,693,151 | 9/1972 | Hasegawa et al. | 340/72 |
| 4,346,365 | 8/1982 | Ingram | 340/72 |
| 4,403,210 | 9/1983 | Sullivan | 340/72 |
| 4,990,887 | 2/1991 | Lee | 340/479 |
| 5,172,095 | 12/1992 | Scott | 340/479 |
| 5,345,218 | 9/1994 | Woods et al. | 340/479 |
| 5,532,674 | 7/1996 | Michaud | 340/479 |
| 5,537,013 | 7/1996 | Toyozumi et al. | 318/283 |
| 5,565,841 | 10/1996 | Pandohie | 340/479 |

FOREIGN PATENT DOCUMENTS

| | | |
|---|---|---|
| 2239701 | 7/1991 | United Kingdom . |
| 2269493 | 2/1994 | United Kingdom . |

*Primary Examiner*—Nina Tong
*Attorney, Agent, or Firm*—Richard C. Litman

[57] ABSTRACT

A brake light system for a vehicle includes features of a conventional vehicle brake lighting system connected to a delay timing means. The brake light system includes rear brake lights connected in a conventional manner with a car battery and a brake pedal switch. The brake light system provides a delay feature whereupon the brake lights continue to be illuminated for a predetermined time period after ceasing depression, or release of the brake pedal, thus moving the brake pedal switch to an opened condition. The brake delay timer member is configured to conveniently adapt conventional vehicle brake light systems by insertion into the vehicle fuse box after removal of the brake light fuse.

3 Claims, 2 Drawing Sheets

DELAYED AUTO BRAKE LIGHT

BACKGROUND OF THE INVENTION

1. Field of the Invention

The present invention relates to a brake light system for a vehicle and, more particularly, a system that operates brake lights for a set period of time after removal of a driver's foot from a vehicle brake pedal and thus opening of a brake pedal switch.

2. Description of Related Art

Conventional brake light systems for vehicles in worldwide use provide rear mounted brake lights that illuminate bright red whenever a brake pedal is depressed and the lights are extinguished when the driver's foot is removed from the brake pedal. To improve the effectiveness of brake lights as warning devices, late model automobiles have been provided with an additional centrally located brake light placed at approximately eye level with respect to drivers of trailing vehicles. Despite such wide spread improvements, rear end collisions continue to occur with substantial frequency, indicating that there is room for improvement.

It has been proposed in the past to intermittently flash the brake lights to more effectively attract the attention of drivers in the trailing vehicles. Examples of such arrangements include U.S. Pat. No. 3,576,527, issued on Apr. 27, 1971 to William E. Howard, U.S. Pat. No. 3,693,151, issued on Sep. 19, 1972 to Tatsuo Hasegawa et al., U.S. Pat. No. 4,346,365, issued on Aug. 24, 1982 to Charles E. Ingram, U.S. Pat. No. 4,403,210, issued on Sep. 6, 1983 to Patrick O. Sullivan, U.S. Pat. No. 5,345,218, issued on Sep. 6, 1994 to Daniel S. Woods et al., and U.S. Pat. No. 5,565,841, issued on Oct. 15, 1996 to Sobas R. Pandohie.

U.S. Pat. No. 5,532,674, issued on Jul. 2, 1996 to Paul J. Michaud, describes a brake lighting system for a motorcycle in which an electrical switch is activated anytime the throttle handle is in its normal or released idle position to illuminate the brake light. Michaud does not suggest the brake delay light according to the claimed invention.

U.S. Pat. No. 4,990,887, issued on Feb. 5, 1991 to Robert Lee, describes a brake lighting system with a delay timer which provides continued illumination of the brake lights for a predetermined period of time after deactivation of the brakes. However, Lee does not suggest the convenient brake light delay application arrangement according to the claimed invention.

Great Britain Pat. No. 2,239,701, published on Jul. 10, 1991, describes a brake lighting system which includes means to detect a parameter related to the degree of braking and means to flash the brake lights with a flashing characteristic which varies with variations in the detected parameters. Great Britain '701 does not suggest the brake delay light according to the claimed invention.

Great Britain Pat. No. 2,269,493, published on Feb. 9, 1994, describes a brake lighting system which includes means to monitor the degree of force/severity and the speed of brake application, and in emergency braking conditions one or more warning lights flash on and off. The warning lights may be the hazard warning lights, the normal brake lights, the rear window mounted third brake light, or all of these together. Great Britain '493 does not suggest the brake delay light according to the claimed invention.

None of the above inventions and patents, taken either singly or in combination, is seen to describe the instant invention as claimed.

SUMMARY OF THE INVENTION

A brake light system for a vehicle according to the present invention includes features of a conventional vehicle brake lighting system connected to a delay timing means. The brake light system includes rear brake lights connected in a conventional manner with a car battery and a brake pedal switch. Whenever the brake pedal switch is closed by depressing the brake pedal of the vehicle, current is directed through the brake lights which will illuminate and remain illuminated until the brake pedal switch is opened. The brake pedal switch is normally moved to a closed condition on depression of a brake pedal to provide power from the battery to the brake lights to achieve illumination thereof. The brake delay lighting system of this invention provides a delay feature whereupon the brake lights continue to be illuminated for a predetermined time period after ceasing depression, or release of the brake pedal, thus moving the brake pedal switch to an opened condition. The brake delay lighting system includes a delay timer member connected to the battery, the brake pedal switch, and the brake lights. The delay timer member is of a conventional nature, provided with adjustment means so the user may change or select the delay time in seconds. The brake delay timer member is configured to conveniently adapt conventional vehicle brake light systems by insertion into the vehicle fuse box after removal of the brake light fuse.

Accordingly, it is a principal object of the invention to provide a vehicle brake light system having rearwardly projecting illuminated brake lights in situations where a brake pedal switch has been released.

It is another object of the invention to provide a vehicle brake light system wherein vehicle brake lights will be illuminated as long as a brake pedal is engaged and continue subject illumination an additional period of time following release of the brake pedal.

It is a further object of the invention to provide a vehicle brake light system which can be configured by installing a delay timer means into an existing vehicle fuse box.

It is an object of the invention to provide improved elements and arrangements thereof in a brake delay lighting system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
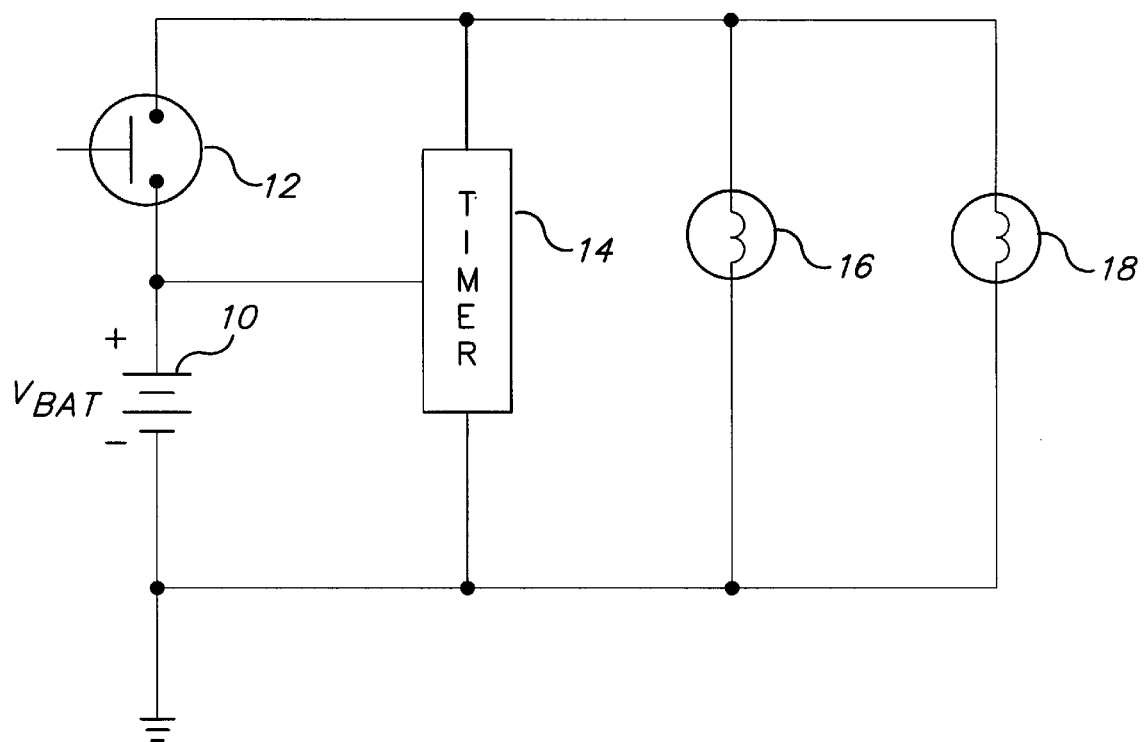
FIG. 1 is a circuit diagram of a brake delay lighting system according to the present invention.

Referring now to the drawings, and particularly to FIG. 1, the brake light system of the present invention is generally indicated. The brake light system includes rear brake lights 16,18 connected in a conventional manner with a car battery 10 and a brake pedal switch 12. Although two brake lights 16,18 are shown it is noted that a number more than two can be used such as three to five or more. Whenever the brake pedal switch 12 is closed by depressing the brake pedal of the vehicle, current is directed through the brake lights 16,18 which will illuminate and remain illuminated until the brake pedal switch is opened. The brake lights 16,18 are connected by a line to the vehicle chassis or ground.

The brake light system includes a conventional delay timer 14 interconnected to the battery 10, the brake pedal switch 12, and the brake lights 16,18. Details of the operation and structure of the delay timer 14 member are relied upon as described and commonly known in the prior art. The delay timer 14 is operable on closure of brake pedal switch 12 to energize a load such as brake lights 16,18. By subsequent opening of brake pedal switch 12, the delay timer 14 is operable in an adjustable predetermined time delay period. If the brake pedal is depressed again at any time during the time delay period, the time delay member 14 will be reset to zero time so that the time delay period will always proceed to its full intended time delay period after removal of foot pressure from the brake pedal.

Figure 2:
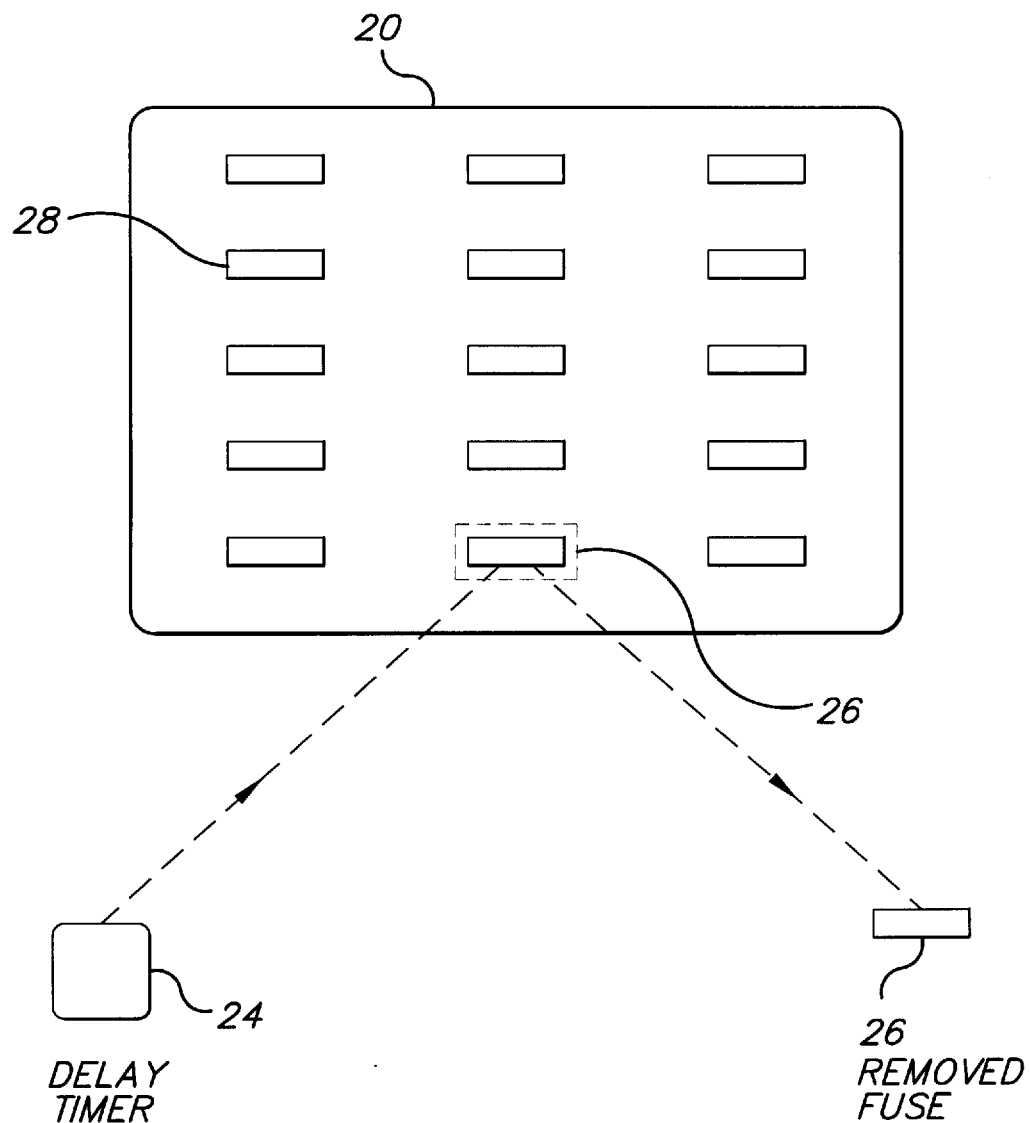
FIG. 2 is an illustration showing installation of a delay timer means in a conventional vehicle fuse box.

The delay timer member is preferably configured in an arrangement which is readily connected to existing vehicle brake lighting systems. As shown in FIG. 2, a conventional vehicle fuse box 20 includes a plurality of vehicle fuses 28, including a fuse 26 for the brake lights 16,18. A delay timer means 24 is inserted into the fuse box after removal of brake light fuse 26 as a retrofit device.

After connecting the delay timer means 24 to a conventional vehicle brake light system, it is noted that the brake pedal switch 12, when depressed by a brake pedal, operates to move downwardly to make electrical contact between terminals. The battery plus potential goes along line brake lights 16,18 and to delay timer means 14 which includes relay contacts.

In this condition, the brake lights 16,18 will remain illuminated as long as the brake pedal is depressed. After the vehicle operators foot is removed from the brake pedal, the adjustable time delay period begins, as time delay means 14 relays remain energized, thus keeping brake lights 16,18 illuminated for the duration of the time delay period.

It is to be understood that the present invention is not limited to the sole embodiment described above, but encompasses any and all embodiments within the scope of the following claims.

I claim:

1. A device for delaying the extinguishing of vehicle brake lights used in a vehicle brake light system, wherein the system includes a power supply, at least one brake light, a brake pedal switch coupled to a brake pedal, and a fuse box, said device comprising:

a fuse delay timer means responsive to the brake pedal switch for maintaining electrical communication between the power source and said at least one vehicle brake light, said timer means adapted for removably coupling to the fuse box, such to replace the existing brake light fuse from the fuse box; and said timer means including relay contacts;

wherein closure of the brake pedal switch causes electrical current to flow through said at least one brake light for as long as said brake pedal switch is closed; and release of said brake pedal switch causes said electrical current to flow for a predetermined period of time following the disengagement of said brake pedal switch, said relay contacts maintaining the flow of electrical current; and wherein any subsequent closure of the brake pedal switch before the expiration of the predetermined period of time causes said timer means to restart timing the predetermined period.

2. A method of using a delay timer in a vehicle brake light system comprising the steps of:

locating an existing brake light fuse from a vehicle fuse box; replacing the brake light fuse with a fuse timing member;

actuating a vehicle brake pedal switch;

establishing electrical communication path between a vehicle power source, the timing member, and at least one vehicle brake light upon actuating the brake pedal switch;

deactuating the vehicle brake pedal switch; and maintaining electrical communication path between the vehicle power source, the timing member, and the at least one vehicle brake light upon the deactuating the brake pedal switch for a predetermined time period;

wherein the timing member maintains the electrical communication path for the predetermined time period after the deactuating the brake pedal switch.

3. A method of installing a delay timer in a vehicle for delaying the extinguishing of the vehicle brake lights after the brake pedal switch has been deactivated, the method comprising the steps of:

locating a vehicle fuse box;

locating a brake light fuse in the vehicle fuse box;

removing the brake light fuse from the vehicle fuse box;

providing a delay timer member adapted to fit in the vehicle fuse box; and placing the timer member in the vehicle fuse box in lieu of the removed fuse.

* * * * *